United States Patent
Katsumura et al.

(10) Patent No.: US 7,195,728 B2
(45) Date of Patent: Mar. 27, 2007

(54) METHOD FOR MOLDING RUBBER PRODUCT

(75) Inventors: Gunpei Katsumura, Aichi (JP); Tomoaki Okita, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 305 days.

(21) Appl. No.: 10/419,208

(22) Filed: Apr. 21, 2003

(65) Prior Publication Data

US 2003/0203993 A1    Oct. 30, 2003

(30) Foreign Application Priority Data

Apr. 26, 2002 (JP) ............................ P2002-127126
Mar. 26, 2003 (JP) ............................ P2003-085730

(51) Int. Cl.
   *B29C 47/00* (2006.01)
(52) U.S. Cl. ................. 264/177.2; 264/211; 264/211.24
(58) Field of Classification Search ...................... None
   See application file for complete search history.

(56) References Cited

U.S. PATENT DOCUMENTS

| 2,315,587 | A | * | 4/1943 | Howland ................. 324/151 R |
| 2,538,809 | A | | 1/1951 | Grotenhuis et al. |
| 2,658,092 | A | * | 11/1953 | Barton ..................... 524/575.5 |
| RE23,948 | E | * | 2/1955 | Fuller .......................... 425/86 |
| 3,209,268 | A | * | 9/1965 | Fraunfelder et al. ............ 327/2 |
| 3,769,257 | A | * | 10/1973 | Gridley et al. .............. 523/319 |
| 3,813,259 | A | * | 5/1974 | Neubert ....................... 427/222 |
| 3,824,206 | A | * | 7/1974 | Baranwal et al. ............ 524/575 |
| 3,976,530 | A | * | 8/1976 | Callan .................... 156/244.24 |
| 4,026,933 | A | * | 5/1977 | Edwards et al. ............ 523/351 |
| 4,065,426 | A | * | 12/1977 | Yamawaki et al. ........... 523/334 |
| 4,130,534 | A | | 12/1978 | Coran et al. |
| 4,197,381 | A | * | 4/1980 | Alia ........................... 525/222 |
| 6,646,028 | B2 | * | 11/2003 | Lopez-Serrano Ramos et al. .......................... 523/351 |
| 2002/0070469 | A1 | * | 6/2002 | Hiatt et al. ................ 264/40.1 |
| 2003/0203993 | A1 | * | 10/2003 | Katsumura et al. ......... 523/351 |
| 2004/0131853 | A1 | * | 7/2004 | Mushiake et al. ...... 428/402.22 |

FOREIGN PATENT DOCUMENTS

| DE | 37 29 237 C1 | 6/1988 |
| DE | 199 25 246 A1 | 12/2000 |
| JP | A-5-154835 | 6/1993 |
| JP | A-6-256002 | 9/1994 |
| JP | A-9-286050 | 11/1997 |
| JP | A-11-193335 | 7/1999 |

OTHER PUBLICATIONS

"The ABC of Rubber Technology," edited by the Society of Rubber Industry, Japan, Tokai Branch pp. 209-210, 214-215, Apr. 1, 1973. (discussed in Specification) - No translation.

\* cited by examiner

*Primary Examiner*—Mark Eashoo
(74) *Attorney, Agent, or Firm*—Posz Law Group, PLC

(57) ABSTRACT

A method of molding a rubber product from a rubber compound by a molding apparatus having a kneading region. A full amount of carbon black (CB) and a full amount of process oil, together with other auxiliary materials except vulcanizing chemicals, are compounded with raw rubber to thereby knead and prepare a granular master batch (granular MB). The rubber product is extrusion-molded and vulcanized after vulcanizing chemicals (a vulcanizing agent and a vulcanization accelerator) are quantitatively supplied into the kneading region of the molding apparatus through a material supply port while the vulcanizing chemicals are mixed with the granular MB.

7 Claims, 2 Drawing Sheets

METHOD FOR MOLDING RUBBER PRODUCT

The present application is based on Japanese Patent Applications No. 2002-127126 and 2003-085730, which are incorporated herein by reference.

BACKGROUND OF THE INVENTION

1. Field of the Invention

The present invention relates to a method adapted for production of a rubber product molded from a novel granular master batch, especially, a rubber-molded product such as a weather strip.

2. Description of the Related Art

Heretofore, for example, an extrudent product such as a weather strip was produced as follows (see "The ABC of Rubber Technology" edited by The Society of Rubber Industry, Japan, Tokai Branch, pp.209–210, 214–215, Apr. 1, 1973).

(1) Kneading in Banbury Mixer:

(i) Veil-like raw rubber of EPDM is cut into pieces with a predetermined size and the pieces are put into a Banbury mixer.

(ii) Auxiliary materials such as stearic acid, zinc oxide, and calcium oxide are put into the mixer.

(iii) A half amount of carbon black is put into the mixer.

(iv) A full amount of process oil is put into the mixer.

(v) The residual amount of carbon black is put into the mixer.

(2) Kneading of Vulcanizing Chemicals in Open Roll Mill:

While the kneaded rubber taken out from the Banbury mixer is wound on a cooled roll, vulcanizing chemicals (a vulcanizing agent and a vulcanization accelerator) are added into and kneaded with the kneaded rubber.

(3) Treatment after Kneading:

The rubber compound which has been already kneaded and compounded is partially taken out from the roll, cooled with water, subjected to an anti-adhesion treatment and preserved.

(4) Extrusion Molding:

The rubber compound is pre-plasticized by a charge roll, extracted in the form of a tape and supplied to a hopper continuously.

In this manner, the kneading operation for preparing the rubber compound is performed by a batch process or a manual process. The number of man-hour becomes therefore large, so that the number of steps for producing the extrudent such as a weather strip becomes large.

SUMMARY OF THE INVENTION

An object of the invention is to provide a method for producing a rubber-molded product, in which the number of steps for producing an extrudent such as a weather strip can be reduced.

The object of the invention is achieved by the following configuration.

A method of molding a rubber product from a rubber compound by a molding apparatus having a kneading region, including the steps of: compounding a substantially full amount of carbon black (CB) and a substantially full amount of process oil with raw rubber to prepare a precursory compound; kneading the precursor compound to prepare at least one kind of granular master batch (granular MB); mixing and dispersing vulcanizing chemicals into one kind of granular MB to prepare a rubber compound; and kneading the rubber compound by supplying the rubber compound into the kneading region of the molding apparatus to thereby mold the rubber product.

In this configuration, the step of kneading the vulcanizing chemicals manually by an open roll mill as in the related art can be dispensed with because kneading of the vulcanizing chemicals can be performed simultaneously in the kneading region of the molding apparatus. Accordingly, the number of steps for producing the rubber-molded product can be reduced. Moreover, because residual powder auxiliary materials including the vulcanizing chemicals can be supplied while mixed with the granular MB(s), the vulcanizing chemicals exhibit a function of preventing the granular MB(s) from blocking (aggregating). Hence, the rubber compound can be put into the kneading region of the molding apparatus smoothly and easily.

In the configuration, the amount of the CB compounded is 50 phr to 300 phr and preferably 100 phr to 200 phr. The amount of the CB compounded can be selected in a wide range, so that a rubber-molded product with a required strength and a required hardness can be obtained easily.

In the configuration, the raw rubber may contain 70% or higher by mass (hereinafter merely referred to as "%") of ethylene-α-olefin rubber (EOR) containing 30% or higher of α-olefin so that a rubber product good in resistance to permanent compression set can be molded.

In the rubber compound containing EOR as raw rubber, blocking of the granular MB(s) occurs easily. It is therefore preferable that crystalline PE as an anti-blocking agent is suitably contained in the rubber compound. When crystalline PE is contained in the rubber compound, anti-blocking characteristic of the granular MB(s) increases.

The granular MB(s) may have a particle size of not larger than 1 mm but generally has a particle size in a range of from 1 mm to 50 mm. If the particle size is too small, blocking (aggregation) occurs easily. If the particle size is too large, a problem occurs easily in kneading and dispersing quality of the vulcanizing chemicals in the kneading region of the molding apparatus.

The rubber compound used in the molding method according to the invention includes: at least one kind of granular MB prepared by kneading a precursory compound obtained by compounding a substantially full amount of CB and a substantially full amount of process oil with raw rubber; and vulcanizing chemicals mixed and dispersed into at least one kind of granular MB. In this configuration, anti-blocking characteristic of the granular MB(s) in the rubber compound is improved, so that both storage stability and transportability of the rubber compound are improved. That is, the usable life of the compound after preparation becomes long, so that the rubber compound can be prepared in advance.

Alternatively, there may be used a method of molding a rubber product, in which the rubber product is molded after supplying the granular MB(s) and vulcanizing chemicals directly into the kneading region of the molding apparatus and kneading and dispersing them in the kneading region without positive mixing of the vulcanizing chemicals with the one kind of granular MB or the two or more kinds of granular MBs by a mixer such as a stirrer.

Incidentally, a technique summarized below but not acting on the novelty of the invention has been described in Unexamined Japanese Patent Publication No. Hei. 9-286050.

The technique described in JP 9-286050 is a technique in which a molded product is extruded through a die after a granular free-flowing unique polymer (i.e., a polymer product under the presence of an inactive granular substance at the time of polymerization) produced in a gas phase, and other auxiliary materials such as process oil, a vulcanizing agent, and a filler are kneaded by a continuous mixer.

The technique is however supposed to be unsuitable to a recipe for compounding of large amounts of CB and process oil because the polymer producing method is unique, a large amount of CB (26 phr at maximum in the embodiment level) is not expected to be contained in the polymer, and a softener such as process oil is not contained in the granular polymer. (A problem occurs easily in kneading and dispersing quality of carbon black.) In the technique, a mixer such as an atomizer is expected to be provided separately for compounding process oil.

DETAILED DESCRIPTION OF THE PREFERRED EMBODIMENTS

A subject of the invention is basically a method for molding a rubber product from a rubber compound by a molding apparatus having a kneading region. In this specification, the term "phr (parts per hundred parts of rubber)" means "parts by mass of a compounding ingredient (auxiliary material) to be compounded with 100 parts by mass of raw rubber".

Figure 1A:
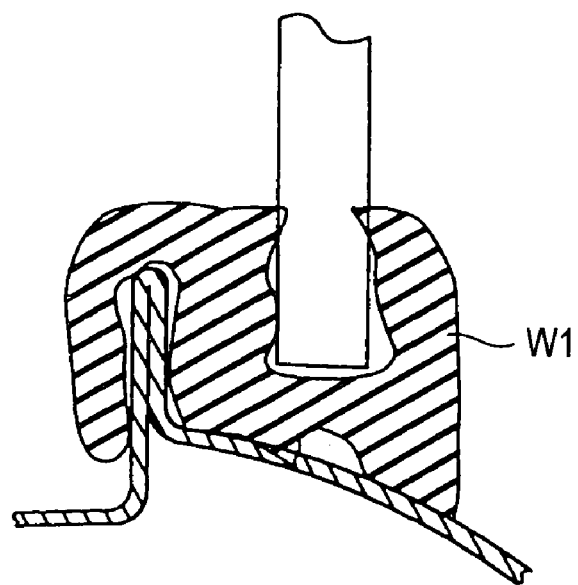
FIG. 1A is a sectional view of a rubber window frame which is an example of the product to which the invention is applied.
Figure 1B:
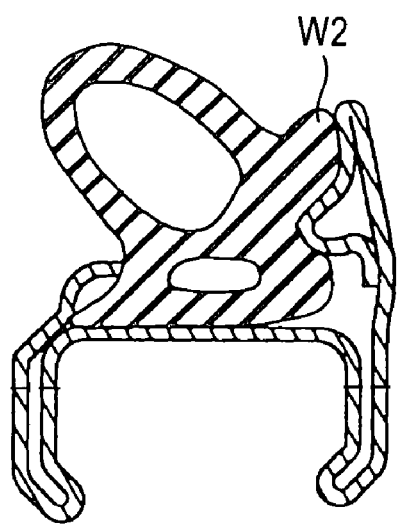
FIG. 1B is a sectional view of a door weather strip which is another example of the product to which the invention is applied.

Although description will be made by way of example on the case where a rubber extrudent for an automobile weather strip (see FIGS. 1A and 1B) or the like is extrusion-molded as a rubber product from a rubber compound containing ethylene-α-olefin rubber (EOR) as raw rubber, the invention is not limited thereto. Incidentally, FIG. 1A shows a rubber window frame W1 and FIG. 1B shows a door weather strip W2.

That is, the molding method according to the invention can be also applied to injection molding if a molding apparatus having a kneading region such as an inline screw injection molding apparatus is used.

The raw rubber is not limited to EOR. The raw rubber can be selected optionally from NR (natural rubber), IR (isoprene rubber), SBR (styrene-butadiene rubber), BR (butadiene rubber), CR (chloroprene rubber), IIR (isobutylene-isoprene rubber), CO/ECO (epichlorohydrin rubber), NBR (nitrile-butadiene rubber), ACM/ANM (acrylic rubber), FKM (fluororubber), Q (silicone rubber), and so on.

Figure 2:
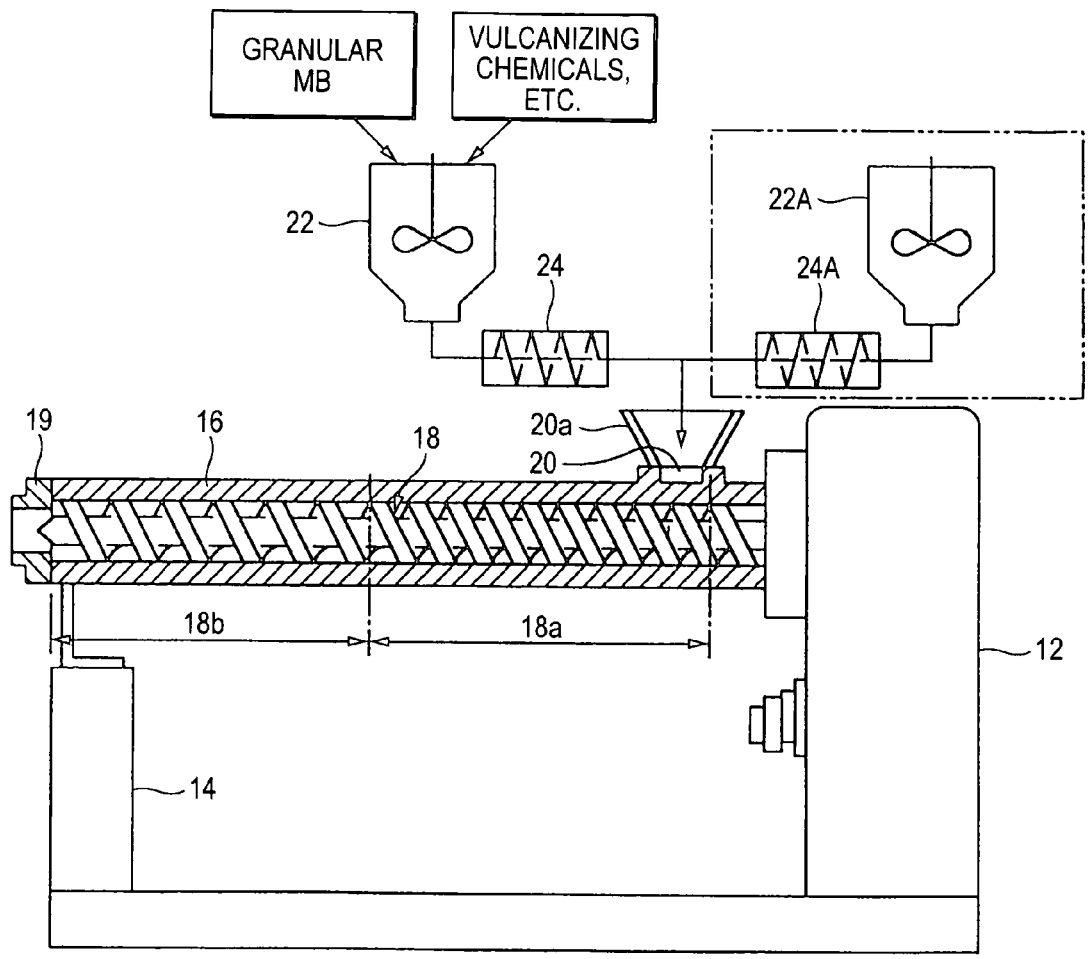
FIG. 2 is a schematic sectional view showing an example of an extrusion molding apparatus to which the invention is applied.

FIG. 2 shows an example of an extruder to which the invention is applied. The extruder has a drive portion body 12, an extrusion barrel 16 supported by the drive portion body 12 and a front prop 14, a kneading/extrusion screw 18 provided in the inside of the extrusion barrel 16, and a supply hopper 20 for supplying a rubber compound to a base portion of the extrusion barrel 16. The supply hopper (supply port) 20 can be supplied with the rubber compound by a rubber compound supply unit which has stirrers (mixers) 22 and 22A, and quantitative determination feeders (screw type) 24 and 24A. Though not shown, vulcanization tanks of a UHF (microwave vulcanizer), an HAV (hot air vulcanizer), etc. are disposed on the front side of the extruder so that vulcanization can be performed continuously while the extrusion-molded product is taken up by a take-up unit not shown.

In the extrusion barrel 16, the base side of the kneading/extrusion screw 18 is provided as a kneading region 18a in which the screw pitch is set to be relatively short, while the front side of the kneading/extrusion screw 18 is provided as an extrusion region 18b in which the screw pitch is set to be relatively long. Incidentally, it is preferable that the kneading region 18a is as long as possible. The ratio of L/D (length/diameter) of the screw 16 is generally selected to be in a range of from 8 to 25, preferably in a range of from 12 to 20.

The extruder may be of a single screw type or of a twin screw type. The type of the extruder can be selected in accordance with the ratio of the amount of residual powder auxiliary materials to the amount of a granular MB which will be described later. When the ratio of the amount of residual powder auxiliary materials to the amount of a granular MB is very low (e.g., lower than a value in a range of from 1% to 3%), for example, because the residual powder auxiliary materials are only vulcanizing chemicals, sufficient kneading and dispersing quality can be obtained by the single screw type extruder.

The granular MB used in the invention is a compound obtained by compounding a substantially full amount of CB and a substantially full amount of process oil with raw rubber and adding vulcanizing chemicals thereto. The term "substantially full amount" means an amount substantially controlling physical properties of kneaded rubber and physical properties of vulcanized rubber, that is, an amount of each compounding ingredient substantially based on a recipe of the rubber compound. In other words, the term "substantially full amount" is supposing that the small amount of carbon black and process oil may be additionally mixed and dispersed at a subsequent step of mixing and dispersing vulcanizing chemicals into the granular MB. The term "small amount" is an amount which does not affect the physical properties of the vulcanized rubber.

Other auxiliary materials (except CB, process oil and vulcanizing chemicals) such as zinc oxide and a white filler to be compounded with the granular MB may be compounded with the granular MB in advance or may be mixed with the granular MB when the vulcanizing chemicals are mixed and dispersed.

It is generally preferable that full amounts of the other auxiliary materials except the vulcanizing chemicals are compounded with the granular MB so that dispersing quality of the vulcanizing chemicals in the kneading region of the molding apparatus can be kept good easily. Incidentally, when the other powder auxiliary materials together with the vulcanizing chemicals need to be mixed with the granular MB before the materials are supplied into the molding apparatus as in the above description, it is preferable that the vulcanizing chemicals are mixed while carried by an inorganic filler so that kneading and dispersing quality of the vulcanizing chemicals can be improved.

Incidentally, when a weather strip is provided as a recipe of a foam, it is preferable that a foaming agent (thermal decomposition type) is not mixed with the granular MB because the foaming agent is apt to be influenced by heat.

Generally, ethylene-propylene (α-olefin)-disjugate diene terpolymer (EPDM) can be preferably used as the EOR. The propylene component of EPDM may be wholly or partially replaced by another α-olefin having 4 to 20 carbon atoms. Generally, EOR containing 60% to 80% of ethylene, 40% to 20% of α-olefin, and 5% or less by mass of disjugate diene is used. Particularly in the case of a rubber product such as a weather strip (sealing material) requiring resistance to permanent compression set, the α-olefin content which can easily meet the demand of resistance to permanent compression set is preferably selected to be relatively high. That is, the α-olefin (e.g., C3) content such as the (C3 content) is selected to be not lower than 25% (about 18 mol %), preferably in a range of from 30% to 35% (about 22 mol % to about 27 mol %). If the α-olefin content is higher than 35% by mass, the ethylene (C2) content becomes so relatively low that it is difficult to obtain required strength.

Examples of the unconjugated diene which can be preferably used include 5-ethylidene-2-norbornene (ENB), dicyclopentadiene (DCPD), and 1,4-hexadiene (1,4-HD). The disjugate diene content is adjusted so that the iodine value is selected to be in a range of from 5 to 25 (generally, the disjugate diene content is not higher than 5%).

When the α-olefin content is selected to be high (not lower than 30%), 3% to 6%, preferably 4% to 5% of crystalline PE is contained. If the α-olefin content is relatively high, the viscosity of raw rubber becomes so high that blocking of the granular MB occurs easily. The provision of crystalline PE prevents the granular MB from blocking.

At the time of production of the polymer, 10 parts to 40 parts of process oil may be added to 100 parts of raw rubber to form an oil extended polymer used as EPDM.

The full amount of raw rubber need not be provided as EPDM (EOR). Blended rubber containing at least 70% of EPDM and another non-polar rubber such as SBR or IIR mutually soluble to EPDM may be used.

The CB is not particularly limited. For example, the CB can be selected optionally from HAF, MAF, FEF, GPF, and SRF. Especially, MAF, FEF, GPF, etc. may be preferably used because both extrusion moldability and strength can be kept good easily. The amount of CB compounded can be selected to be in a range of from 50 phr to 300 phr. From the point of view of strength and dispersibility at the time of preparation of the granular MB, the amount of CB compounded is preferably selected to be in a range of from 100 phr to 200 phr. If the amount of CB compounded is too large, a problem occurs easily in dispersibility of CB at the time of preparation of the granular MB.

The term "vulcanizing chemicals" means a combination of a vulcanizing agent and a vulcanization accelerator. In the case of sulfur vulcanizing chemicals, a sulfur vulcanizing agent such as powder sulfur and at least one member selected from the group of vulcanization accelerators such as a thiazole compound, a thiuram compound, and a dithiocarbamate compound are selected suitably.

When ethylene-α-olefin rubber is used as raw rubber, examples of the other auxiliary materials except the vulcanizing chemicals may include zinc oxide, a lubricant (such as stearic acid), a white filler (such as clay, calcium carbonate or silica), and a dehydrating agent (such as calcium carbonate).

Incidentally, examples of the foaming agent may include 4,4'-oxybisbenzenesulfonylhydrazide (OBSH), azobisdiformamide (ADCA), dinitrosopentamethylenetetramine (DPT), p-toluenesulfonylhydrazide (TSH), and azobisisobutyronitrile (AZDN). A foaming assistant may be added to the foaming agent.

Incidentally, in the above description, the vulcanizing chemicals/foaming agent may be preferably used in the form of an inorganic carrier foam using inorganic powder as a carrier (see Unexamined Japanese Patent Publication No. Hei. 11-193335).

The granular MB used in the invention can be produced, for example, in such a manner that the compound (precursory compound) except the vulcanizing chemicals is extruded by using EOR and an extrusion kneader and cut in water (e.g., see Unexamined Japanese Patent Publication No. Hei. 5-154835).

The particle size of the granular MB on this occasion may be smaller than 1 mm but is generally selected to be in a range of from 1 mm to 5 mm, preferably in a range of from 1.5 mm to 3 mm. If the particle size of the granular MB is too small, blocking of the granular MB occurs easily. If the particle size of the granular MB is too large, a problem occurs easily in kneading and dispersing quality of the vulcanizing chemicals etc. in the kneading region of the molding apparatus. Incidentally, calcium stearate or the like may be added suitably into the granular MB to apply anti-blocking treatment to the granular MB.

Next, a continuous kneading and molding method using the granular MB will be described with reference to FIG. 2.

Figure 3:
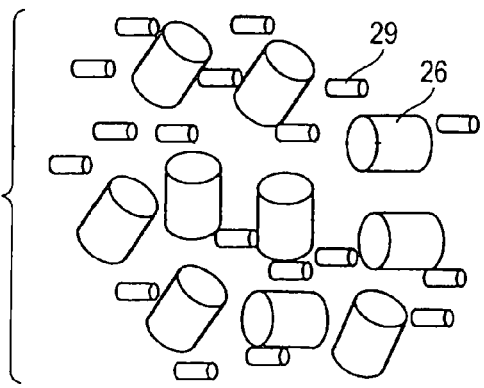
FIG. 3 is a theoretical view showing an anti-blocking function in the case where vulcanizing chemicals are applied on the granular MB used in the invention.

First, the granular MB, and powder auxiliary materials including a predetermined amount of vulcanizing chemicals (hereinafter referred to as "vulcanizing chemicals etc.") are slightly stirred by the stirrer 22 so that the vulcanizing chemicals, etc. are mixed with and dispersed into the granular MB. The term "mixed and dispersed" means a state in which the granular MB is covered with the vulcanizing chemicals, etc. On this occasion, the vulcanizing chemicals, etc. 29 serve as an anti-blocking agent for the granular MB 26 (see FIG. 3). Accordingly, the usable life of the granular MB can become so long that both storage stability and transportability of the granular MB are improved.

In this state, the rubber compound mixed and dispersed into the granular MB is supplied to the supply hopper 20a of the rubber compound supply port 20 of the extrusion molding apparatus 15 by the quantitative determination feeder 24.

On this occasion, because the vulcanizing chemicals serve as an anti-blocking agent for the granular MB, the rubber compound is dropped down and supplied to the material supply port (rubber compound supply port) 20 smoothly without occurrence of any bridge or the like in the supply hopper 20a.

Thus, the rubber compound as the granular MB mixed with the vulcanizing chemicals etc. is carried to the extrusion region 18b of the kneading/extrusion screw 18 after the vulcanizing chemicals are kneaded and dispersed into the granular MB in the kneading region 18a of the kneading/extrusion screw 18. On this occasion, dispersibility of the vulcanizing chemicals into the granular MB is good.

The kneaded and mixed rubber carried to the extrusion region 18b is extruded as a weather strip (rubber extrudent) having a predetermined sectional shape from the extrusion die 19 attached to the front end of the extrusion barrel 16.

For example, a microwave heater and a hot air heater may be provided for the vulcanization or two hot air heaters different in temperature setting condition may be provided successively for the vulcanization. Further, a microwave heater may be interposed between hot air heaters for the vulcanization. Incidentally, the vulcanizing unit (vulcanization tank) may be of a fluidized-bed vulcanization type.

Generally, the vulcanizing condition is 180–240° C. for 3–30 minutes and preferably 210–230° C. for 5–20 minutes.

Although this embodiment has shown the case where the granular MB is stirred and mixed with the vulcanizing chemicals, etc. by one stirrer 22 and then supplied to the material supply port 20 via the quantitative determination feeder 24 so as to be continuously molded, the invention can be also applied to the case where another stirrer 22A shown as a portion surrounded by the chain double-dashed line in FIG. 2 is provided separately so that a molded product using another type granular MB can be produced.

For example, granular MBs constituted by different kinds of raw rubber (e.g., using a combination of EOR different in hardness for adjusting hardness) may be mixed with corresponding vulcanizing chemicals etc. by the two stirrers 22 and 22A respectively so that rubber compounds are quantitatively supplied to the material supply port 20 through the supply hopper 20a from the quantitative determination feeders 24 and 24A respectively.

The stirrers 22 and 22A maybe replaced by material supply hoppers having no stirrers respectively. That is, the granular MB put into one material supply hopper and the vulcanizing chemicals put into the other material supply hopper are directly quantitatively supplied to the material supply port 20 from the quantitative determination feeders 24 and 24A respectively without positive stirring. In this case, the granular MB is generally treated with an anti-blocking agent such as calcium stearate. Alternatively, two or more material supply hoppers for supply of granular MBs may be provided so that different kinds of granular MBs put into the material supply hoppers respectively can be supplied to the material supply port 20 in the aforementioned manner.

Incidentally, in the case of a two-color extruder, two supply ports are provided so that the granular MBs can be supplied to the supply ports respectively.

An example for confirming the effect of the invention will be described below.

In the following recipe, chemicals except vulcanizing chemicals (a vulcanization accelerator and sulfur), together with EPDM, were put into a twin-screw type kneading extruder having a multi-stage mixing region. An extrudent from the extruder was cut in water to prepare a granular MB (2 mmΦ×2 mmL).

Incidentally, EPDM used was an oil-extended blended polymer containing 100 parts of raw rubber (containing 34% of propylene, and 4.3% of the third component (ENB)), 10 parts of paraffinic oil, and 20 parts of crystalline PE.

| | |
|---|---|
| EPDM (containing process oil and PE) | 130 parts (EPDM amount 23% in the total recipe) |
| CB (FEF type) | 170 parts |
| White filler (calcium carbonate) | 40 parts |
| Paraffinic process oil | 80 parts |
| Stearic acid | 1 part |
| Zinc oxide | 3 parts |
| Dehydrating agent (calcium carbonate) | 5 parts |
| Vulcanization accelerator (thiuram compound/dithiocarbamate compound) | 2 parts |
| Powder sulfur | 1 part |

The vulcanizing chemicals were added to the prepared granular MB and mixed and dispersed into the prepared granular MB by the stirrer 22 to form a rubber compound. The rubber compound was put into the material supply port 20 of the extrusion molding apparatus via the quantitative determination feeder 24, so that a belt material 2 mm thick and 160 mm wide was extrusion-molded by the extrusion molding apparatus. The belt material was cut by 150 mm and press-molded (under the vulcanizing condition of 170° C. for 10 min) to obtain a sample piece.

Specifications of the molding apparatus: "GE70K" made by Mitsuba, L/D=100/70 (about 14)

Kneading/molding condition:

Screw rotational speed: 39 rpm

Screw temperature: 60° C.

Barrel temperature: 65° C.

Die temperature: 70° C.

Physical properties of vulcanized rubber in the molded sample piece were measured according to JIS K 6251 "Method for Tensile Test of Vulcanized Rubber", JIS K 6253 "Method for Hardness Test of Vulcanized Rubber and Thermoplastic Rubber" and JIS K 6262 "Method for Permanent Set Test of Vulcanized Rubber and Thermoplastic Rubber" respectively. It was confirmed from results of these tests that the molded product according to the invention had good dispersibility.

| PHYSICAL PROPERTIES OF VULCANIZED RUBBER | |
|---|---|
| Tensile strength ($T_B$) | 9.4 MPa |
| Breaking elongation ($E_B$) | 470% |
| Tensile stress ($M_{100}$) | 3.02% |
| Rubber hardness (spring type A method) | 75 |
| Permanent compression set (Cs:77° C. × 22 h) | 27% |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of molding a rubber product from a rubber compound consisting essentially of:

compounding a substantially full amount of carbon black (CB) and a substantially full amount of process oil with raw rubber to prepare a precursory compound;

kneading said precursory compound to prepare at least one granular master batch (granular MB);

transporting said one granular MB in an extrusion molding apparatus having a mixer, a kneading region and an extrusion region;

mixing and dispersing vulcanizing chemicals into said one granular MB to prepare a rubber compound in said mixer of said extrusion molding apparatus;

kneading said rubber compound by supplying said rubber compound into said kneading region of said extrusion molding apparatus; and extruding said kneaded rubber compound in said extrusion region of said extrusion molding apparatus to thereby mold said rubber product.

2. A method of molding a rubber product according to claim 1, wherein an amount of said CB compounded is in a range of from 50 phr to 300 phr.

3. A method of molding a rubber product according to claim 2, wherein the amount of said CB compounded is in a range of from 100 phr to 200 phr.

4. A method of molding a rubber product according to claim 1, wherein said raw rubber in said rubber compound contains at least 70% by mass of ethylene-α-olefin copolymer rubber containing at least 30% by mass of α-olefin.

5. A method of molding a rubber product according to claim 4, wherein said rubber compound contains crystalline polyethylene (crystalline PE) in an amount of 3 phr to 30 phr.

6. A method of molding a rubber product according to claim 1, wherein said at least one kind of granular MB has a particle size of 1 mm to 50 mm.

7. A method of molding a rubber product according to claim 1, wherein said rubber compound is extruded through a die secured to said extrusion region of said extrusion molding apparatus.

* * * * *